United States Patent [19]

Kotani et al.

[11] Patent Number: 5,560,997
[45] Date of Patent: Oct. 1, 1996

[54] FILM FOR LABEL

[75] Inventors: Kozo Kotani, Toyonaka; Toshio Kawakita, Ibaraki; Takanori Kume, Ibaraki; Takashi Sakakibara, Ibaraki, all of Japan

[73] Assignees: Sumitomo Chemical Company Limited, Osaka; Lintec Corporation, Tokyo, both of Japan

[21] Appl. No.: 562,942

[22] Filed: Nov. 27, 1995

Related U.S. Application Data

[63] Continuation of Ser. No. 83,161, Jun. 29, 1993, abandoned.

[30] Foreign Application Priority Data

Jul. 1, 1992 [JP] Japan ..................... 4-174221

[51] Int. Cl.⁶ .................................. B32B 27/00
[52] U.S. Cl. .................. 428/500; 428/195; 428/212; 428/217; 428/218; 428/411.1; 428/515; 428/910
[58] Field of Search ................... 525/240, 528; 428/195, 212, 217, 218, 411.1, 515, 910

[56] References Cited

U.S. PATENT DOCUMENTS

| | | | |
|---|---|---|---|
| 4,782,110 | 11/1988 | Wolfe . | |
| 4,831,095 | 5/1989 | Ohmae et al. | 526/307 |
| 4,948,657 | 8/1990 | Ogawa et al. | 428/218 |
| 4,975,313 | 12/1990 | Ezawa et al. | 428/213 |
| 5,145,728 | 9/1992 | Itaba et al. | 428/213 |
| 5,151,309 | 9/1992 | Dollinger | 428/40 |
| 5,268,220 | 12/1993 | Tajima et al. | 428/220 |
| 5,288,548 | 2/1994 | Weber | 428/315.9 |
| 5,302,431 | 4/1994 | Schultz | 428/35.7 |

FOREIGN PATENT DOCUMENTS

| | | | |
|---|---|---|---|
| 0084350 | 1/1983 | European Pat. Off. | B32B 27/00 |
| 0138054A3 | 4/1985 | European Pat. Off. . | |
| 0335425 | 2/1986 | European Pat. Off. | G08F 3/02 |
| WO86/01550 | 3/1986 | European Pat. Off. | D21H 1/04 |
| 0235930A2 | 9/1987 | European Pat. Off. . | |
| 0445955A2 | 9/1991 | European Pat. Off. . | |
| WO9300401 | 1/1993 | France . | |
| 61-107378 | 5/1986 | Japan . | |
| 61-107377 | 5/1986 | Japan | G09F 3/03 |

OTHER PUBLICATIONS

Derwent Publications Ltd., London, GB; AN 86-200988 & JP-A-61 133,236 (Showa Denko) Jun. 20, 1986 *abstract*.
Derwent Publications Ltd., London, GB; AN 81-38172D & BE-A-886 134 (Rasmussen) May 13, 1981 *abstract*.
Derwent Publications Ltd., London, GB; AN 85-293953 & JP-A-60 203 653 (Toray) Oct. 15, 1985 *abstract*.

*Primary Examiner*—William A. Krynski
*Attorney, Agent, or Firm*—Sughrue, Mion, Zinn, Macpeak & Seas

[57] ABSTRACT

A film for labels having a high severability in die cutting consisting of a film having a phase separate structure produced by shaping into film a resin composition comprising 20 to 80% by weight a polypropylene resin, and 20 to 80% by weight a polyethylene resin having a density of 0.91 to 0.93 g/cm$_3$ said film having a Young's modulus of 2000 to 6000 Kg/cm$^2$ and a thickness of 0.02 to 0.20 mm.

4 Claims, No Drawings

FILM FOR LABEL

This is a continuation of application Ser. No. 08/083,161 filed Jun. 29, 1993, now abandoned.

BACKGROUND OF THE INVENTION

1. Field of the Invention

The present invention relates to a film for labels having an easy cutting property. More particularly, the present invention relates to a film for labels having a freely deformable property, and a high severability in cutting, which is excellent in severability at the time of die cutting in the process of production of the labels, in adaptability to labelling, and in accommodating property to a flexible vessel to which the label is attached.

2. Description of the Related Art

Labelling films have been used as adornment on the outer surfaces of containers and required to have the most basic characteristic, i.e., the severability into labels of various sizes and configurations when cutting with a die. In addition, there are marketed numerous flexible containers as well as hard ones so that they are also required to have a freely deformable property (referred to as accommodative property hereunder) accommodating to the configurations of the containers, particularly of flexible containers.

Japanese Patent KOKAI (Laid-open) No. Sho 61-107377 discloses a high severability film having a low Elmendorf tear strength suitable for cap labels as proposed therein. However, the tear strength of the film of this patent is too low for labels on flexible containers causing a problem that the labels tear when the containers are deformed.

U.S. Pat. No. 4,587,158 proposes a freely deformable label comprising polyethylene resins.

In order to accommodate the labels to flexible containers, polyethylene resins having an appropriately low rigidity have been heretofore preferred to be used. However, a lower rigidity causes problems that in the, step of affixing labels cut on a release sheet onto containers by an automated labelling machine, the labels are not successfully released from the release sheet or wrinkled making it impossible to, affix uniformly (such property of the labels is referred to as adhesive property hereunder). Particularly, films having a lower rigidity have a poor severability so that they can not be satisfactorily cut in a predetermined label form in the die cutting step (referred to as severability in die cutting hereunder) to inhibit stable supply of labels resulting in a lower productivity at a high loss.

The present inventors have made an intensive research to develop a film for labels having a good accommodative property to flexible containers, a good adhesive property and a satisfactory die cut severability to overcome the problems as described above, and as a result, have found that films having various performances preferred for labels can be attained by mixing a polypropylene resin and a polyethylene resin and allowing them to be present in a phase separate structure. The present invention is based on this findings.

SUMMARY OF THE INVENTION

An object of the present invention is to provide a film for labels having a high severability in die cutting consisting of a film having a phase separate structure produced by forming into film a resin composition comprising 20 to 80% by weight polypropylene resin, and 20 to 80% by weight polyethylene resin having a density of 0.91 to 0.93 g/cm$^3$, said film having a Young's modulus of 2000 to 6000 Kg/cm$^2$ and a thickness of 0.02 to 0.20 mm.

Another object of the present invention is to provide a film for labels having a high severability in die cutting as described above, where the polypropylene resin is homopolypropylenes having a melt flow rate of 10 to 60 g/10 minutes at 230 °C.

Still another object of the present invention is to provide a film for labels having a high severability in die cutting as described above where the polyethylene resin is branched polyethylenes having a melt flow rate of 5 to 30 g/10 minutes at 190° C. produced by a polymerization under high pressure.

Still another object of the present invention is to provide a film for labels having a high severability in die cutting as described above, where the polypropylene resin is homopolypropylenes having a melt flow rate of 10 to 60 g/10 minutes at 230 °C. and the polyethylene resin is branched polyethylenes having a melt flow rate of 5 to 30 g/10 minutes at 190 °C. produced by a polymerization under high pressure.

DETAILED DESCRIPTION OF PREFERRED EMBODIMENTS

The film for labels having a high severability in die cutting according to the present invention can be produced by mixing a polypropylene resin and a polyethylene resin in a certain proportion and allowing a phase separate structure to be formed.

The content of the polypropylene resin in the film of the present invention should be 20 to 80% by weight, preferably 50 to 70% by weight in view of the severability in die cutting.

If the amount of the polypropylene resin is lower than 20% by weight, the resultant film has too low rigidity to achieve satisfactory labelling operation as well as a homogeneous structure to diminish the severability in die cutting. An amount of the polypropylene resin over 80% allows the resultant film to have so high rigidity that it has a reduced accommodative property to flexible containers as well as a reduced severability in die cutting.

The Young's modulus of the film should be in the range of 2000 to 6000 Kg/cm$^2$ in view of the adhesive property and accommodative property to flexible containers of the labels. A Young's modulus less than 2000 Kg/cm$^2$ does not realize good adhesive property. A Young's modulus over 6000 Kg/cm$^2$ results in an reduction in accommodative property to flexible containers.

The film for labels having a high severability in die cutting of the present invention should have a thickness of 0.02 to 0.20 mm. If the thickness of the film is thinner than 0.02 mm, the adhesive property is reduced, while if it is over 0.20 mm, the accommodative property to flexible containers is diminished.

The polypropylenes to be used in the present invention include, for example, homopolypropylenes, random or block copolymers of ethylene and propylene, propylene and butene, ethylene and propylene and butene, or any one of combinations thereof. Particularly, homopolypropylenes having a melt flow rate of 10 to 60 g/10 minutes at 230° C. is preferred from the standpoint of the severability in die cutting imparted by a phase separate structure formed with polyethylene resin.

The melt flow rate the polypropylene resin can be controlled by decomposition thereof with organic peroxides and the like.

The polyethylene resins having a density of 0.91 to 0.93 g/cm³ to be used in the present invention include, for example, low density polyethylenes, copolymers of ethylene and at least one of α-olefin having 4 to 18 carbon atoms, and copolymers of ethylene and vinyl acetate and/or organic carboxylic acid derivatives having ethylenic unsaturated bonds such as methyl(meth)acrylates. A density of lower than 0.91 g/cm³. results in local reduction in rigidity, while a density of higher than 0.93 g/cm³ causes locally an excessive increase in rigidity.

Especially branched polyethylenes having a melt flow rate of 5 to 30 g/10 minutes at 190° C. produced by polymerization under a high pressure are preferred in view of the severability in die cutting.

The polypropylene resins, and the polyethylene resins having a density of 0.91 to 0.93 g/cm³ to be used in the present invention must not be compatible with each other to produce a phase separate structure. The phase separate structure should not consist of the polypropylene resin and the polyethylene resin present perfectly independent of each other, but consist of polypropylene resin-rich domains and polyethylene resin-rich domains, preferably each domain having so high concentration of its proper resin as close to an independent sole resin domain.

Generally the phase separate structure depends upon characteristics of the resins used (melt flow rate, chemical compositions and the like), a combination thereof, and processing conditions. Preferably the phase separate structure should have a maximum dimension of the domain of one µm or larger in the cross-section along the direction perpendicular to the film processing direction to achieve a good severability in die cutting.

For example, when the dispersed material is the polyethylene resin of the present invention, the dispersed domains in the film have an elongated rod shape (cylindrical shape) with the longitudinal axis of the rod being oriented parallel to the film processing direction. When the diameter of the rod is around one µm or larger, films having a good severability in die cutting can be produced.

In addition to the phase separate structure as described above, when the tear strength of the film in the direction transverse to the film processsing direction is in the range of 130 to 160 kg/cm at a separating speed of 200 mm/min., there can be produced those films having a more excellent severability in die cutting. More preferably the tear strength should be in the range of 130 to 150 kg/cm.

In the present invention, preferably the both sides of the film should be treated to have a critical surface tension of 42 dyne/cm or more. Particularly, one side should preferably be matted by contacting with a rubber roll to facilitate application of an adhesive In the polypropylene resins and the polyethylene resins of the present invention, antioxidants, dispersants, antistatic agents, and colorants may be incorporated so long as the incorporation thereof does not substantially adversely affect the effects of the present invention.

A process for producing the film for labels of the present invention can be conducted, for example, as follows: First, a polypropylene resin and a polyethylene resin, and if necessary, stabilizing agent, colorant, dispersant, and the like are mixed or kneaded by a conventional process with a roll or Banbury mixer, or a single screw or double screw extruder to produce a composition. Then the aforementioned composition is subjected to an ordinary forming process such as T-die processing to produce a film for labels of the present invention.

In order to distinctly realize the phase sepanate structure, the polypropylene resin and the polyethylene resin may simply be mixed in the particulate or powdery form, without prekneading, and subjected to a conventional shaping process by T-die processing to produce the film for labels of the present invention. Moreover, the resultant film may be stretched monoaxially or biaxially. In the case of monoaxial stretching, generally the roll stretching is preferred, though the tubular stretching may be employed. The stretching can be effected in a single step or multiple step process. The biaxial stretching may be performed by simultaneous biaxial stretching, or by successive biaxial stretching consisting of first stretching in the longitudinal direction and then stretching in the transverse direction.

The film for labels having a good severability in die cutting of the present invention have a high accommodative property to flexible containers and a good adhesive property and in addition a good severability in die cutting, so that it is extremely useful for labels to be affixed on squeezable bottles and the like.

The present invention will be described in detail with reference to Examples, but not by way of limitation. The physical properties indicated in Examples and Comparative Examples were determined by the measuring techniques as follows:

Young's modulus: Measurement was made at a temperature of 23° C. according to JIS K7113.

Melt flow rate: Measurement was made at a temperature of 230° C. under a test loading of 2.16 kgf for the polypropylene resin and at a temperature of 190° C. under a test loading of 2.16 kgf for the polyethylene resin according to JIS K7210.

Severability in die cutting: The conditions of the film when punched with circular blade of having a diameter of 7 mm were evaluated under the following standard (the evaluation of Elmendorf tear strength did not give sufficient relationship with practical severability in die cutting):

⊚: the film was uniformly and completely cut along the circular line with an extremely clean cut edge.

○: the film was completely cut along the circular line.

Δ: the film was cut, but not perfectly with some unsevered sites.

X: the film was only partly cut.

Leather method tear strength: Value obtained by dividing a numerical value from the measurement according to JIS-K-6772-1976 by the thickness of the sample.

EXAMPLE 1

60% by weight of a polypropylene resin, SUMITOMO NOBLEN® HZ100A (available from SUMITOMO CHEMICAL Co. Ltd., Density: 0.90 g/cm³, Melt flow rate: 27 g/10 minutes) and 40% by weight of a polyethylene resin, SUMIKATHENE® G701 (available from SUMITOMO CHEMICAL Co. Ltd., Density: 0.918 g/cm³, Melt flow rate: 7.0 g/10 minutes) were kneaded with PCM-45 double screw extruder (available from IKEGAI SEISAKUSHO Co.) to produce particulate resin composition. Then the resin composition was processed by T-die processing at a temperature of 230° C. to produce a film having a thickness of 70 µm.

The resultant film had a satisfactory severability in die cutting and a proper Young's modulus to the film for labels.

EXAMPLE 2

A film was prepared by the identical process to that in Example 1, except that 30% by weight of the polypropylene resin and 70% by weight of the polyethylene resin were used.

The resultant film had the identical severability in die cutting to that in Example 1 and a proper Young's modulus to the film for labels.

EXAMPLE 3

50% by weight of a polypropylene resin which had been prepared by decomposing SUMITOMO NOBLEN® HH100 (available from SUMITOMO CHEMICAL Co. Ltd., Density: 0.90 g/cm$^3$, Melt flow rate: 4 g/10 minutes) with an organic peroxide, 2,5-dimethyl-2,5-di-tertiary butyl peroxyhexane, added in an amount of 0.0024 part by weight based on 100 parts by weight of the resin to a melt flow rate of 30 g/10 minutes, and 50% by weight of a polyethylene resin, SUMIKATHENE® G701 (available from SUMITOMO CHEMICAL Co. Ltd., Density: 0.918 g/cm$^3$, Melt flow rate: 7.0 g/10 minutes) were processed in the same procedure as in Example 1 to produce a film having a thickness of 70 μm. The resultant film had a identical severability in die cutting to that in Example 1 and a proper Young's modulus to the film for labels.

composition of propylene/ethylene in a weight ratio of 96.8/3.2, Melt flow rate: 6.0 g/10 minutes) without any polyethylene resin was processed to produce a film. The resultant film had significantly inferior severability in die cutting and was unsuitable for the film for labels.

Comparative Rxample 3

A film was prepared by performing the same process as that in Example 1, except that the film thickness was 0.3 mm. The resultant film was too high in rigidity, poor in accommodative property to flexible containers and unsuitable for the film for labels.

Comparative Example 4

A film was prepared by performing the same process as that in Example 3, except that the decomposition of the polypropylene resin with the organic peroxide was not conducted. The resultant film was poor in severability in die cutting so that it was unsuitable for the film for labels.

The results as above are summarized in Table 1.

TABLE 1

|  | Example 1 | Example 2 | Example 3 | Example 4 | Comp. Ex. 1 | Comp. Ex. 2 | Comp. Ex. 3 | Comp. Ex. 4 |
| --- | --- | --- | --- | --- | --- | --- | --- | --- |
| Film thickness (μm) | 70 | 70 | 70 | 70 | 70 | 70 | 300 | 70 |
| Severability in die cutting | ⊚ | ○ | ⊚ | ⊚ | Δ | X | — | Δ |
| Young's modulus (kg/cm$^2$) | | | | | | | | |
| MD | 3800 | 2500 | 3700 | 4100 | 1500 | 4700 | — | 3600 |
| TD | 3600 | 2200 | 3200 | 4000 | 1200 | 4500 | — | 3000 |
| Leather method tear strength (kg/cm) TD* | 150 | — | 143 | 131 | — | — | — | 128 |
| Remarks | | | | | | | Poor accommodative property | |

*Direction transverse to the machine direction.

EXAMPLE 4

A film was prepared by the identical process to that in Example 1, except that 70% by weight of the polypropylene resin and 30% by weight of the polyethylene resin were used.

The resultant film had the identical severability in die cutting to that in Example 1 and a proper Young's modulus to the film for labels.

Comparative Example 1

A film was prepared by the identical process to that in Example 1, except that 10% by weight of the polypropylene resin and 90% by weight of the polyethylene resin were used.

The resultant film had a low Young's modulus, inferior adhesive property, and poor severability in die cutting so that it is unsuitable for the film for labels.

Comparative Example 2

A polypropylene resin, SUMITOMO NOBLEN® RW130 (available from SUMITOMO CHEMICAL Co. Ltd., Density: 0.90 g/cm$^3$, Random polypropylene having a monomer

What is claimed is:

1. A film for labels consisting of a film formed from a resin composition comprising 50 to 70% by weight a polypropylene resin, and 30 to 50% by weight a polypropylene resin having a density of 0.91 to 0.93 g/cm$^3$, said film having a Young's modulus of 2000 to 6000 Kg/cm$^2$ and a thickness of 0.02 to 0.20 mm, wherein said Young's modulus is measured at a temperature of 23° C. according to JIS K7113.

2. The film for labels according to claim 1, wherein said polypropylene resin is a homopolypropylene having a melt flow rate of 10 to 60 g/10 minutes at 230° C.

3. The film for labels according to claim 1, wherein said polyethylene resin is a branched polyethylene having a melt flow rate of 5 to 30 g/10 minutes at 190° C. produced by a polymerization under high pressure.

4. The film for labels according to claim 1, wherein said polypropylene resin is a homopolypropylene having a melt flow rate of 10 to 60 g/10 minutes at 230° C. and said polyethylene resin is a branched polyethylene having a melt flow rate of 5 to 30 g/10 minutes at 190° C. produced by a polymerization under high pressure.

* * * * *

UNITED STATES PATENT AND TRADEMARK OFFICE
CERTIFICATE OF CORRECTION

PATENT NO. : 5,560,997
DATED : October 1, 1996
INVENTOR(S) : Kozo Kotani et al

It is certified that error appears in the above-indentified patent and that said Letters Patent is hereby corrected as shown below:

Column 6, line 47-48, claim 1, change "30 to 50% by weight a polypropylene" to --30 to 50% by weight a polyethylene--.

Signed and Sealed this

Eleventh Day of March, 1997

Attest:

BRUCE LEHMAN

Attesting Officer

Commissioner of Patents and Trademarks